Patented Aug. 12, 1952

2,606,934

UNITED STATES PATENT OFFICE 2,606,934

ALKYLENE OXIDE-METHYLOL PHENOL REACTION PRODUCTS

Robert W. Martin, Lenox, Mass., assignor to General Electric Company, a corporation of New York No Drawing. Application January 4, 1951, Serial No. 204,466

11 Claims. (Cl. 260—613)

This application is a continuation-in-part of my earlier filed application, Serial No. 122,128 filed October 18, 1949, now Patent Number 2,579,329, and assigned to the same assignee as the present invention.

This invention is concerned with novel compositions of matter. More particularly, the invention relates to the reaction product of a mixture of ingredients comprising (1) a methylol phenol corresponding to the general formula

I

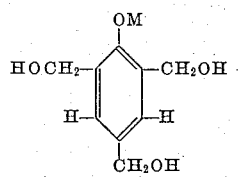

where M is a member selected from the class consisting of hydrogen, sodium, and barium, and (2) an alkylene oxide corresponding to a general formula

II

where R is a member selected from the class consisting of hydrogen, aliphatic, alkoxyaliphatic, aryl, aliphatic-substituted aryl, aryl-substituted aliphatic, and aryloxyaliphatic radicals. The invention also embraces resinous compositions containing derivatives of these reaction products, especially esterfied derivatives of the above reaction products which are useful as plasticizers for vinyl halide resins, for example, polyvinyl chloride, etc.

In the above Formula II, R may be, for example, aliphatic, for instance, alkyl, e. g., methyl, ethyl, propyl, isobutyl, amyl, etc.; unsaturated aliphatic, for example, vinyl, allyl, methallyl, etc.; alkoxyaliphatic, e. g., methoxyethyl, ethoxymethyl, ethoxybutyl, etc.; aryl, e. g., phenyl, etc.; aliphatic-substituted aryl, e. g., tolyl, xylyl, ethylphenyl, etc.; aryl-substituted aliphatic, e. g., benzyl etc.; aryloxyaliphatic, e. g., phenoxymethyl, phenoxyethyl, tolyloxypropyl, etc.

Among the compounds which may be formed, are, for instance, those corresponding to the general formula

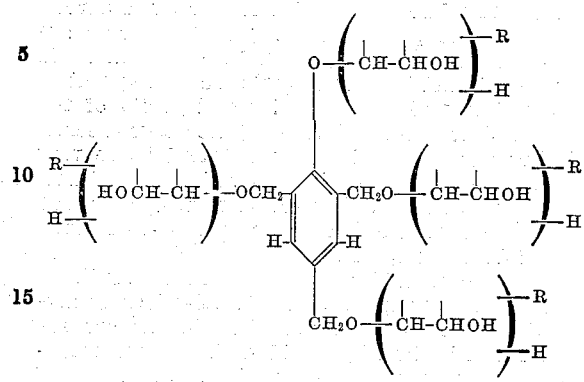

where R has the meaning given above. The position of R will depend upon the manner in which the alkylene oxide ring reacts.

The above disclosed reaction products can be made by effecting reaction between the alkylene oxide and the preformed methylol derivative (Formula I). I have found that the reaction of the alkylene oxide appears to go more readily with the phenolic hydroxyl group than with the methylol group. The extent of the reaction will depend in many instances on the reactivity of the alkylene oxide and the duration of the reaction. The reaction is believed to be stepwise and it is possible to react one, two, or three of the methylol groups as well as the phenolic hydroxyl or potential hydroxyl groups (e. g., the sodium or barium methylol phenates) with the alkylene oxide.

In the following examples methods are disclosed for preparing the sodium and barium salts of trimethylol phenol which then can be reacted with the alkylene oxide.

The sodium and barium salts of trimethylol phenol may be formed very simply and isolated as crystalline compounds. More particularly, the crystalline sodium and barium salts of trimethylol phenol may be prepared by effecting reaction between about three mols of formaldehyde and one mol of phenol in the presence of about one mol of alkali such as the hydroxides of sodium and barium at a temperature such that no resinous material is formed. This temperature has been found to range up to about 65° C. above which temperature undesired side reactions take place. The salt of trimethylol phenol can then be precipitated by diluting or pouring the reaction mixture into a suitable water-miscible solvent and separated from the liquid by filtration, decantation or other suitable means.

While the example above calls for molar quantities of alkali, only catalytic quantities of alkali, for example, about one per cent by weight, are required for the phenol-formaldehyde reaction. It will be seen therefore that phenol and formaldehyde may be allowed to react to form the trimethylol compound in the presence of a small amount of alkali at which time the rest of the alkali may be added to form the salt.

Many solvents are suitable for precipitating the salts of trimethylol phenol, e. g., methanol, ethanol, n-propanol, isopropanol, tertiary butanol, secondary butanol, isobutanol, n-butanol, tertiary amyl alcohol, allyl alcohol, diacetone alcohol, butyl carbitol, pyridine, 2-(2'-hydroxyethyl)-pyridine, phenyl Cellosolve, acetone, acetonitrile, propionitrile, morpholine, diethylenetriamine, methylal, dimethyl Cellosolve, dioxane, etc. In general alcohols with no more than four carbon atoms are the most efficient precipitating agents and particularly those with two or three carbon atoms. The preferred precipitating agents are ethanol, propanol, isopropanol and acetone. Of these, ethanol is most suitable from the point of view of low cost, availability and purity of the product obtained. Mixtures of the above precipitating agents also have been found to be very useful. Among the mixtures which are suitable are, by volume, 50-50 n-butanol and methanol, 50-50 methanol and acetone and 50-50 n-amyl alcohol and methanol.

The only metal hydroxides found to be suitable for the preparation of salts of 2,4,6-tris(hydroxymethyl)phenols or trimethylol phenols are sodium and barium hydroxides. While formaldehyde is mentioned above, equivalent amounts of paraformaldehyde may be used.

The following examples illustrate the preparation of the sodium and barium salts of trimethylol phenol or 2,4,6-tris(hydroxymethyl)-phenol:

Example I

To 188 parts by weight (2 mols) of phenol were added 90 parts by weight (2.25 mols) of sodium hydroxide which had been previously dissolved in 70 parts by weight of water. The mixture was cooled and allowed to crystallize; 588 parts by weight (7.3 mols) of mormalin (37.2% by weight formaldehyde) were added and the mixture stirred. The temperature of the reaction mixture rose spontaneously to a maximum of 45° C. and then dropped slowly The mixture was kept at room temperature fifteen to twenty hours, dehydrated under vacuum with heat until the temperature in the flask rose to 45° C. and poured into several times its volume of ethanol. After 3-4 hours the resultant precipitate of sodium trimethylol phenate was filtered and dried.

Theoretical yield, 412 parts by weight.

Actual yield, 335 parts by weight or 81.3% of theory.

Example II

Formalin in the amount of 140 parts by weight (1.73 mols), forty-seven parts by weight (0.5 mol) of phenol and forty-seven parts by weight (0.55 equivalent) anhydrous barium hydroxide dissolved in seventy-five parts by weight of hot water were mixed in that order. The reaction mixture was kept at a temperature of 30° C. or lower for two hours. The mixture was allowed to react for twenty-four hours at room temperature. Ethanol in the amount of 1600 parts by weight was added with vigorous mechanical stirring. The resulting precipitate of barium trimethylol phenate, after standing a few hours, was filtered off, washed with acetone and dried in a vacuum desiccator.

Theoretical yield, 125.3 parts by weight.

Actual yield, 97.9 parts by weight or 77.8% of theory.

Example III

To 76.2 parts by weight (0.945 mol) of formalin were added while stirring 23.5 parts by weight (0.25 mol) of phenol and twelve parts by weight (0.33 mol) of sodium hydroxide, dissolved in fifteen parts by weight of water. The temperature of the reaction mixture was held at 30° C. or less for two hours. The mixture was put in an oven for twenty-two hours at a temperature of 40° C. Next, 804 parts by weight of n-propanol was poured into the reaction mixture and the mix stirred. The resulting precipitate was filtered off, washed with acetone and ether and dried in a vacuum desiccator.

Theoretical yield, 51.5 parts by weight.

Actual yield, 50.8 parts by weight or 98% of theory.

Other methods for making the sodium and barium salts of symmetrical trimethylol phenol are more specifically disclosed in my aforementioned copending application Serial No. 122,128. The latter application also discloses steps taken to identify the salts formed as being actually the ones claimed to have been obtained.

It is to be noted that, consistent with the rules of orientation, only those phenols possessing free reactive hydrogen atoms in all three positions ortho and para to the phenolic hydroxyl group can form trimethylol compounds, e. g. phenol, m-cresol and 3,5-xylenol. However, from actual experiment, it has been found that 3,5-xylenol forms a product in which the salts of uni- and bis(hydroxymethyl) compounds predominate along with resinous products. No evidence has been obtained of the formation of the salt of the tris(hydroxymethyl) compound. When m-cresol is used only low yields of the salts of tris(hydroxymethyl) compound can be obtained due to the fact that the resins are readily formed. From the examples given above, it will also be noted that the reaction may be carried out at various temperatures, the lower temperatures ranging at around 0° C. requiring a reaction time of several days while the reaction at temperatures around 60° C. takes place in several hours. However, temperatures of over 65° C. will cause undesirable side reaction.

The hydroxyl groups of the tris(hydroxymethyl)phenols may be converted to ether groups by reacting an alkylene oxide corresponding to the general formula

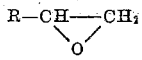

where R represents a member of the class consisting of hydrogen, aliphatic, alkoxyaliphatic, aliphatic-substituted aryl, aryl, aryl-substituted aliphatic, and aryloxyaliphatic groups including their halogen-substituted derivatives with (2) a tris(hydroxymethyl) compound corresponding to the general formula

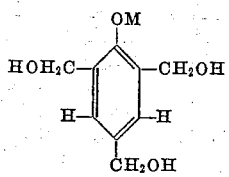

where M represents a member of the class consisting of hydrogen, sodium and barium.

*Example IV*

That both the phenolic hydroxyl group and the hydroxymethyl groups of tris (hydroxymethyl) phenols or their salts are reactive to alkylene oxides was shown by the following experiment: Forty-one parts of sodium 2,4,6-tris(hydroxymethyl)phenate (approximately 0.2 mol) was dissolved in 100 pts. by weight of water. Fourteen parts by weight of propylene oxide (approximately 0.24 mol) was added and the mixture heated at 40° C. for 6⅔ hours. Analysis of the product by means of ultraviolet absorption showed that the propylene oxide had reacted 60 per cent with the phenate groups and 40 per cent with the hydroxyl group of the hydroxymethyl substituents.

Theoretically, if 4 mols of alkylene oxide had been employed for each mol of sodium tris (hydroxymethyl)phenate each of the three hydroxymethyl groups and the phenolic hydroxyl group would carry a hydroxypropyl substituent. However, since the products formed by reaction of alkylene oxides with tris(hydroxymethyl) phenol are in themselves reactive with alkylen oxides, polyglycols may form on one hydroxymethyl or phenolic group while another group is left unreacted. It therefore becomes evident that pure compounds are not obtained, but instead a mixture of compounds are formed. If more than four mols of alkylene oxide is reacted with sodium tris(hydroxymethyl)phenate or with 2,4,6-tris-(hydroxymethyl) phenol, then polyglycol ethers are of necessity formed. The excess alkylene oxide, above four mols, reacts with the hydroxyl group of the already formed glycol ether to give polyglycol ether groups.

Other oxides such as butylene oxide, styrene oxide, glycidyl phenyl ether, glycidyl allyl ether, and butadiene monoxide among others may also be reacted to give analogous compounds all of which are useful as plasticizers for various resins.

Here again, from an economical point of view, it is advantageous to use reaction products produced from a mixture of the uni-, bis- and tris-(hydroxymethyl) compounds with the tris(hydroxymethyl) compound present, preferably though not essentially in an amount of over fifty per cent as in the following examples. However, I do not intend to be limited to this per cent since smaller (e. g., 10 to 40 per cent) or larger per cents (e. g., from 10 to 90 per cent), of the total of uni- and bis-(hydroxymethyl) phenyl compounds corresponding to the general formula

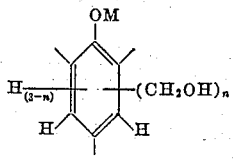

where M has the meanings given above and $n$ is an integer equal to from 1 to 2, inclusive, may also be used without departing from the scope of the invention.

*Example V*

An aqueous solution of a mixture of uni-, bis-, and tris(hydroxymethyl) phenols was prepared by reacting at 40° C. for fifteen to twenty hours, ninety-four parts by weight of phenol with 250 parts by weight of approximately 37% aqueous formalin in the presence of four parts by weight of sodium hydroxide dissolved in fifty parts by weight of water. To half of the solution placed in a flask, 230 parts by weight of glycidyl allyl ether was added dropwise. After addition of the ether, the mixture was refluxed for four hours. After thirty to forty-five minutes of heating, a light yellow solution had formed. The final reaction mixture was dehydrated to give 315 parts by weight of a yellow, very slightly viscous oil. This gave a product in which an average of one molecule of the glycidyl allyl ether had reacted for each hydroxy group present in both the phenolic hydroxy and hydroxymethyl group.

*Example VI*

A solution of a mixture of uni-, bis-, and tris-hydroxymethyl)phenols, containing a major proportion of the tris derivative was prepared by reacting ninety-four parts by weight of phenol, two hundred and fifty parts by weight of aqueous formalin with four parts by weight of sodium hydroxide in fifty parts by weight of water as a catalyst for fifteen to twenty hours at about 40° C. To the resultant solution 280 parts by weight of 3,4-epoxybutene-1 was added dropwise and this mixture refluxed for three hours. The product, after dehydration was a light yellow, slightly viscous oil, in which an average of one molecule of 3-4 epoxybutene-1 had reacted for each hydroxy group present in both the phenolic and hydroxymethyl groups.

*Example VII*

One hundred, eighty-eight parts by weight of phenol, 470 parts by weight of aqueous formalin and eight parts by weight of sodium hydroxide in 100 parts by weight of water were mixed together and heated at 40° C. for fifteen to twenty hours. The reacted solution was halved and to each half, 812 parts by weight of propylene oxide was added dropwise followed by refluxing for three and one-half hours. After the water and small amount of unreacted propylene oxide were distilled off, the mixture was neutralized and further distilled to give an orange, slightly viscous product in which an average of approximately three molecules of propylene oxide had reacted with each hydroxyl group of the mixture of hydroxymethyl phenols.

*Example VIII*

Ninety-four parts by weight of phenol and two hundred and fifty parts by weight of an aqueous formalin solution and four parts by weight of sodium hydroxide in fifty parts by weight of water were mixed and kept at 40° C. overnight. The mixture was cooled and 154 parts by weight of ethylene oxide added. The resulting mixture was heated at 40° C. for two hours and at 60° C. for four hours. The solution was filtered and concentrated in a vacuum with gentle heating. When the temperature inside the flask reached 40° C., the solution was neutralized. The vacuum dehydration was continued until the inside temperature reached 75° C. A very light green, slightly viscous material in the amount of 252 parts by weight was obtained.

Compounds of the above type have also been found very useful in plasticizing alkyd resins, as wax modifiers, surface active agents and humectants. The four hydroxyl groups of these compounds impart rapid air-drying properties to alkyd resins using these compounds as polyhydric alcohols. Fifty parts by weight of the product was refluxed with 350 parts by weight of propionic acid and forty-three parts by weight of toluene for about seven hours. A take-off trap was used to collect water formed during the reaction. The toluene and excess propionic acid was distilled off by heating under a vacuum on a steam bath to give a light-brown mobile liquid ester. Forty parts by weight of this propionate ester, sixty parts by weight of polyvinyl chloride, two and one-half parts by weight of litharge and a like amount of lead silicate stabilizer were milled on a set of heated rolls. A molded test piece had a brittle point of −250° C., a volume resistivity of $0.075 \times 10^{12}$ ohms per centimeter cube. The tensile strength was 2,940 pounds per square inch with a 303 per cent elongation at break.

It will of course be apparent to those skilled in the art that instead of using the alkylene oxides employed in the foregoing examples, other alkylene oxides, many examples of which have been given above and in the formulas appearing in the application, may be employed without departing from the scope of the invention. In addition, the molar ratio of the alkylene oxide and the particular methylol phenol employed may also be varied within wide limits. Thus, although it is preferable to employ at least the same number of mols of alkylene oxide as there are hydroxyl groups and potential hydroxyl groups as, for example, the —OM group on the benzene nucleus where M is either sodium or barium, it will be apparent that smaller molar amounts of the alkylene oxide may also be used whereby it is possible to obtain derivatives wherein some of the hydroxyl groups will not be replaced with the residue from the alkylene oxide. Thus, on a molar basis, I may use, for example, from about 1 to 4, or even as high as 6 mols or more of the alkylene oxide per mol of the methylol phenol or the methylol phenate. When the molar ratio of alkylene oxide to methylol groups is one or less, there is greater tendency towards resinification. It is therefore preferable to use high ratios of alkylene oxide to the methylol phenols, e. g., from 3 to 10 mols of the alkylene oxide per mol of methylol phenol or methylol phenate.

The conditions of reaction for obtaining my claimed reaction products may also be varied and the reaction may be carried out at temperatures ranging, for example, from about room temperature as high as 60° or 65° C. As pointed out previously, temperatures in excess of 65° C. cause a decrease in yield of the desired compounds since at temperatures above 65° C. resinification of the methylol groups begins to take place and increases rapidly as the temperature rises. However, after effecting reaction with one or two of the hydroxyl groups or potential hydroxyl group, the tendency towards resinification is greatly minimized and thereafter higher reaction temperatures, e. g., from 70° to 100° C. may be employed.

The claimed compositions of matter are useful as intermediates in the preparation of other material particularly esters thereof whereby esterification can take place of the hydroxyl groups of the alkylene oxide residue and of any hydroxyl groups remaining from the original methylol phenol or methylol phenate, to produce esters which are useful, for example, as plasticizers for various resins, particularly vinyl halide resins, e. g., polyvinyl chloride, copolymers of vinyl chloride and vinyl acetate, etc.

Although it is difficult to isolate individual compounds as a result of the reaction of the methylol phenol or methylol phenate with the alkylene oxide, the claimed compositions of matter are definite mixtures which can be reproduced at will following essentially the same conditions in each case. Their character and constitution can be determined by ascertaining the number of mols of alkylene oxide which have reacted with the methylol phenol or methylol phenate.

What I claim as new and desire to secure by Letters Patent of the United States is:

1. A composition of matter comprising the product of reaction at a temperature ranging up to 65° C. of a mixture of ingredients comprising (1) a methylol phenol corresponding to the general formula

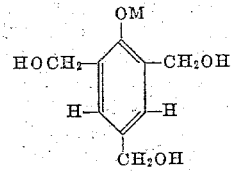

where M is a member selected from the class consisting of hydrogen, sodium, and barium, and (2) an alkylene oxide corresponding to the general formula

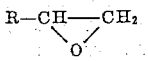

where R is a member selected from the class consisting of hydrogen, aliphatic, alkoxyaliphatic, aryl, aliphatic-substituted aryl, aryl-substituted aliphatic, and aryloxyaliphatic radicals.

2. A composition of matter comprising the product of reaction at a temperature ranging up to 65° C. of a mixture of ingredients comprising (1) a mixture of methylol phenols comprising (a) a methylol phenol corresponding to the general formula

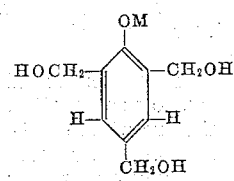

and (b) mixture of methylol phenols corresponding to the general formula

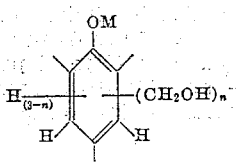

where M is a member selected from the class consisting of hydrogen, sodium, and barium, and $n$ is an integer equal to from 1 to 2, inclusive, and (2) an alkylene oxide corresponding to the general formula

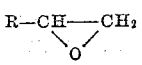

where R is a member selected from the class consisting of hydrogen, aliphatic, alkoxyaliphatic, aryl, aliphatic-substituted aryl, aryl-substituted aliphatic, and aryloxyaliphatic radicals.

3. A composition of matter comprising the product of reaction at a temperature ranging up to 65° C. of a mixture of ingredients comprising (1) a methylol phenol corresponding to the general formula

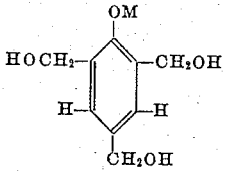

where M is a member selected from the class consisting of hydrogen, sodium, and barium, and (2) propylene oxide.

4. A composition of matter comprising the product of reaction at a temperature ranging up to 65° C. of a mixture of ingredients comprising (1) a methylol phenol corresponding to the general formula

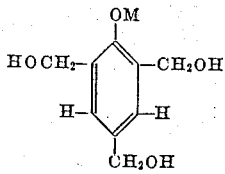

where M is a member selected from the class consisting of hydrogen, sodium, and barium, and (2) glycidyl allyl ether.

5. A composition of matter comprising the product of reaction at a temperature ranging up to 65° C. of a mixture of ingredients comprising (1) a methylol phenol corresponding to the general formula

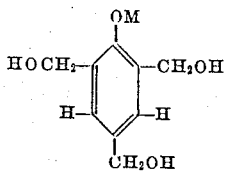

where M is a member selected from the class consisting of hydrogen, sodium, and barium, and (2) 3,4-epoxybutene-1.

6. A composition of matter comprising the product of reaction at a temperature ranging up to 65° C. of a mixture of ingredients comprising (1) a methylol phenol corresponding to the general formula

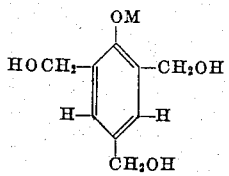

where M is a member selected from the class consisting of hydrogen, sodium, and barium, and (2) ethylene oxide.

7. A composition of matter comprising the product of reaction at a temperature ranging up to 65° C. of a mixture of ingredients comprising (1) sodium 2,4,6-tris(hydroxymethyl)phenate and (2) propylene oxide.

8. A composition of matter comprising the product of reaction at a temperature ranging up to 65° C. of a mixture of ingredients comprising (1) sodium 2,4,6-tris(hydroxymethyl)phenate and (2) glycidyl allyl ether.

9. A composition of matter comprising the product of reaction at a temperature ranging up to 65° C. of a mixture of ingredients comprising (1) sodium 2,4,6-tris(hydroxymethyl)phenate and (2) 3,4-epoxybutene-1.

10. A composition of matter comprising the product of reaction at a temperature ranging up to 65° C. of a mixture of ingredients comprising (1) sodium 2,4,6-tris(hydroxymethyl)phenate and (2) ethylene oxide.

11. A composition of matter comprising the product of reaction at a temperature ranging up to 65° C. of a mixture of ingredients comprising (1) barium 2,4,6-tris(hydroxymethyl)phenate and (2) propylene oxide.

ROBERT W. MARTIN.

REFERENCES CITED

The following references are of record in the file of this patent:

UNITED STATES PATENTS

| Number | Name | Date |
|---|---|---|
| 1,976,677 | Wittwer | Oct. 9, 1934 |
| 2,213,477 | Steindorff et al. | Sept. 3, 1940 |
| 2,495,232 | Drisch et al. | Jan. 24, 1950 |
| 2,499,365 | De Groote et al. | Mar. 7, 1950 |
| 2,503,726 | Greenlee | Apr. 11, 1950 |